(12) United States Patent
Gschossmann

(10) Patent No.: US 7,560,918 B2
(45) Date of Patent: Jul. 14, 2009

(54) ELECTRONIC CIRCUIT CONFIGURATION FOR OPTIONALLY CONNECTING ROTARY SPEED SENSORS, ESPECIALLY IN COMMERCIAL VEHICLES

(75) Inventor: Günther Gschossmann, Ampfing (DE)

(73) Assignee: KNORR-BREMSE Systeme für Nutzfahrzeuge GmbH, Müenchen (DE)

( * ) Notice: Subject to any disclaimer, the term of this patent is extended or adjusted under 35 U.S.C. 154(b) by 0 days.

(21) Appl. No.: 10/575,382

(22) PCT Filed: Oct. 8, 2004

(86) PCT No.: PCT/EP2004/011247

§ 371 (c)(1),
(2), (4) Date: Dec. 12, 2006

(87) PCT Pub. No.: WO2005/035329

PCT Pub. Date: Apr. 21, 2005

(65) Prior Publication Data

US 2007/0103145 A1    May 10, 2007

(30) Foreign Application Priority Data

Oct. 10, 2003    (DE) ................ 103 47 117

(51) Int. Cl.
*G01P 3/44* (2006.01)
(52) U.S. Cl. ...................................... 324/160
(58) Field of Classification Search ............... 324/166, 324/167, 173, 174, 178–180, 207.25, 207.24, 324/207.15, 207.2, 207.21, 160; 73/510, 73/514.39
See application file for complete search history.

(56) References Cited

U.S. PATENT DOCUMENTS

| | | | |
|---|---|---|---|
| 4,573,139 A | 2/1986 | Bonivich | |
| 4,831,510 A | 5/1989 | Dummermuth et al. | |
| 4,847,555 A | 7/1989 | Stammer et al. | |
| 4,939,455 A * | 7/1990 | Tsugawa | 324/168 |
| 5,500,585 A | 3/1996 | Aab | |
| 5,940,780 A | 8/1999 | Azar et al. | |
| 5,998,989 A | 12/1999 | Lohberg | |
| 6,472,863 B1 * | 10/2002 | Garcia | 324/173 |
| 6,504,360 B1 * | 1/2003 | Lohberg et al. | 324/202 |
| 2003/0201766 A1 * | 10/2003 | Faetanini et al. | 324/173 |

FOREIGN PATENT DOCUMENTS

| | | |
|---|---|---|
| DE | 38 31 520 | 4/1989 |
| DE | 195 20 299 | 12/1996 |
| DE | 100 22 457 | 11/2001 |
| DE | 196 02 243 | 11/2001 |
| WO | 95 17680 | 6/1995 |

OTHER PUBLICATIONS

Translation of International Preliminary Report on Patentability from International Patent Application No. PCT/EP2004/011247, Jan. 4, 2007.
Translation of Written Opinion of the International Searching Authority from International Patent Application No. PCT/EP2004/011247, Jan. 20, 2005.

* cited by examiner

*Primary Examiner*—Kenneth J Whittington
(74) *Attorney, Agent, or Firm*—Kenyon & Kenyon LLP

(57) ABSTRACT

An electronic circuit configuration for optionally connecting an active rotary speed sensor or a passive rotary speed sensor to an electronic control unit of a commercial vehicle.

14 Claims, 1 Drawing Sheet

ELECTRONIC CIRCUIT CONFIGURATION FOR OPTIONALLY CONNECTING ROTARY SPEED SENSORS, ESPECIALLY IN COMMERCIAL VEHICLES

FIELD OF THE INVENTION

The present invention relates to an electronic circuit configuration for connecting at least one rotary speed sensor of a vehicle via an assigned signal conditioning circuit to a control unit for further signal processing of the rotary speed signal.

BACKGROUND INFORMATION

Rotary speed sensors of the kind of interest here are used in vehicle technology to obtain one of the most important input variables for the electronic control of a vehicle. Thus, the conventional antilock brake systems (ABS), antislip controls (ARS) and vehicle stability control systems (FSR, ASMS) are forced to rely on permanent measurement and evaluation of the rotary speed response of the individual vehicle wheels. The rotary speed signals of each individual vehicle wheel are recorded and transmitted via a sensor line to an electronic control unit, for the purpose of being evaluated.

Rotary speed sensors exist of very different types of construction and working capacity. It is true that rotary speed sensors installed in vehicles are made up basically of an encoder rotating together with a wheel in form of a toothed disk, perforated disk, or the like, and a stationary measurement detector. For reasons of technology and cost, inductive sensors or measurement detectors were preferred up till now, in which the encoder generates an alternating signal that corresponds to the rotary motion of the vehicle's wheel. The frequency of the alternating signal is evaluated in different ways to obtain the rotary speed data.

Currently, so-called passive rotary speed sensors have the greatest distribution, which work according to the reluctance principle. These rotary speed sensors have as measurement detector a copper coil having a permanent magnet. The measurement detector is coupled magnetically to the recording disk used as the measurement transducer or to another encoder. The encoder modulates the magnetic switch reluctance in synchronous motion, an alternating voltage representing the motion being induced in the copper coil, whose frequency may be evaluated as measured quantity for ascertaining the rotary wheel speed. The magnitude of the induced signal voltage is a function of the rotary speed and of the air gap between the measurement transducer and the measurement detector, or between the toothing and the rotary speed sensor.

Besides that, so-called active rotary speed sensors are also generally known, to which the subject matter of the present invention relates. Active rotary speed sensors are made up in principle of the combination of a magnetostatically sensitive element having a permanent magnet, which is magnetically coupled to the encoder. Here too, the encoder modulates synchronous in motion the magnetic switch reluctance or the field direction, the sensor element reacting with the change in the flux density or to the motion of a field vector. Known examples of such magnetostatically sensitive elements are Hall probes and magnetoresistive structures based on permalloy alloys. The magnitude of the signal voltage at the rotary speed sensor is a function of the air gap, but is independent of the rotary speed and the frequency. Active rotary speed sensors are therefore gaining more and more importance.

An active rotary speed sensor of this type is known from International Published PCT Application No. 95 17680. The fixed part of the rotary speed sensor includes a magnetoresistive sensor element having a permanent magnet that is used as booster magnet, and besides that has electronic circuit components for signal conditioning. An active rotary speed sensor requires a current supply. The output signal of the active rotary speed sensor is a binary current signal, which is composed of impressed currents of different amplitudes. The rotary speed information is located in the frequency or in the change between the two current levels. Known rotary speed sensors of this type give rise to a square wave signal, whose frequency reproduces the measured rotary speed.

For the further processing of the information supplied by the active rotary speed sensor, a microcontroller is usually inserted, on whose input side the circuit for the signal conditioning is preconnected. A passive rotary speed sensor also requires a signal conditioning circuit for connection to a microcontroller as the electronic control unit for additional signal processing of the rotary speed signal. Since the signal conditioning circuit for the connection of an active rotary speed sensor is constructed in a different manner from the signal conditioning circuit for the connection of a passive rotary speed sensor, the sensor type determines the type of signal conditioning circuit that is to be used.

SUMMARY OF THE INVENTION

It is the object of the present invention to create an electronic circuit configuration for connecting at least one rotary speed sensor, which permits the operation of both active rotary speed sensors and passive rotary speed sensors without having to exchange the assigned signal conditioning circuit.

The object is attained starting from an electronic circuit configuration in conjunction with its distinguishing features.

The present invention includes the technical teaching that a signal conditioning circuit includes means for optionally connecting an active rotary speed sensor or a passive rotary speed sensor.

The advantage of the design approach according to the present invention is particularly that, for the connection of, for instance, an active rotary speed sensor instead of a passive rotary speed sensor, the appertaining signal conditioning circuit does not also have to be exchanged. The signal conditioning circuit thus works independently of the sensor type connected to it and is equipped for the signal processing of rotary speed signals both of active rotary speed sensors and passive rotary speed sensors.

Preferably, the circuit means for optionally connecting an active rotary speed sensor or a passive rotary speed sensor include, on the one hand, a signal conditioning subcircuit for the active rotary speed sensor and, on the other hand, a signal conditioning subcircuit for the passive rotary speed sensor. Depending on the connected sensor type, the correct signal conditioning subcircuit is able to be activated using at least one switching element.

Advantageously, the electronic control unit is used for the automatic detection of the currently connected sensor type, whereupon the former activates the at least one switching element for the selection of the suitable signal conditioning subcircuit. Alternatively to this, it is also possible to carry out the appropriate activation of the switching element manually, for instance, by using a toggle switch. The automatic activation via the electronic control unit does, however, have the advantage that adjustment work for adjusting to the connected type of sensor completely drops out, which reduces the assembly expenditure and also avoids possible errors. According to one preferred specific embodiment, the switching element for the selection of the signal conditioning subcircuit is designed like a bipolar transistor, whose base connection is able to be activated via the electronic control unit. Alternatively to this, it is also possible to execute the switching element as a FET transistor or as a relay, or the like.

According to an additional measure improving the present invention, it is provided that one switching element is connected in each case parallel to the two sensor inputs A and B of the signal conditioning subcircuit for the passive rotary speed sensor, in each case preconnected damping diodes being provided for preventing a damaging current from the signal conditioning subcircuit for the active rotary speed sensor in the case of the connecting of a passive rotary speed sensor. Thus, we are starting here from a signal conditioning subcircuit for a passive rotary speed sensor which is broadened by a signal conditioning subcircuit for the active rotary speed sensor The damping diodes make possible the circuit-technological combination of the two signal conditioning subcircuits, in a simple manner.

BRIEF DESCRIPTION OF THE DRAWING

The FIGURE shows an electronic circuit configuration for optionally connecting an active rotary speed sensor or a passive rotary speed sensor to an electronic control unit of a commercial vehicle.

DETAILED DESCRIPTION

Figure 1:
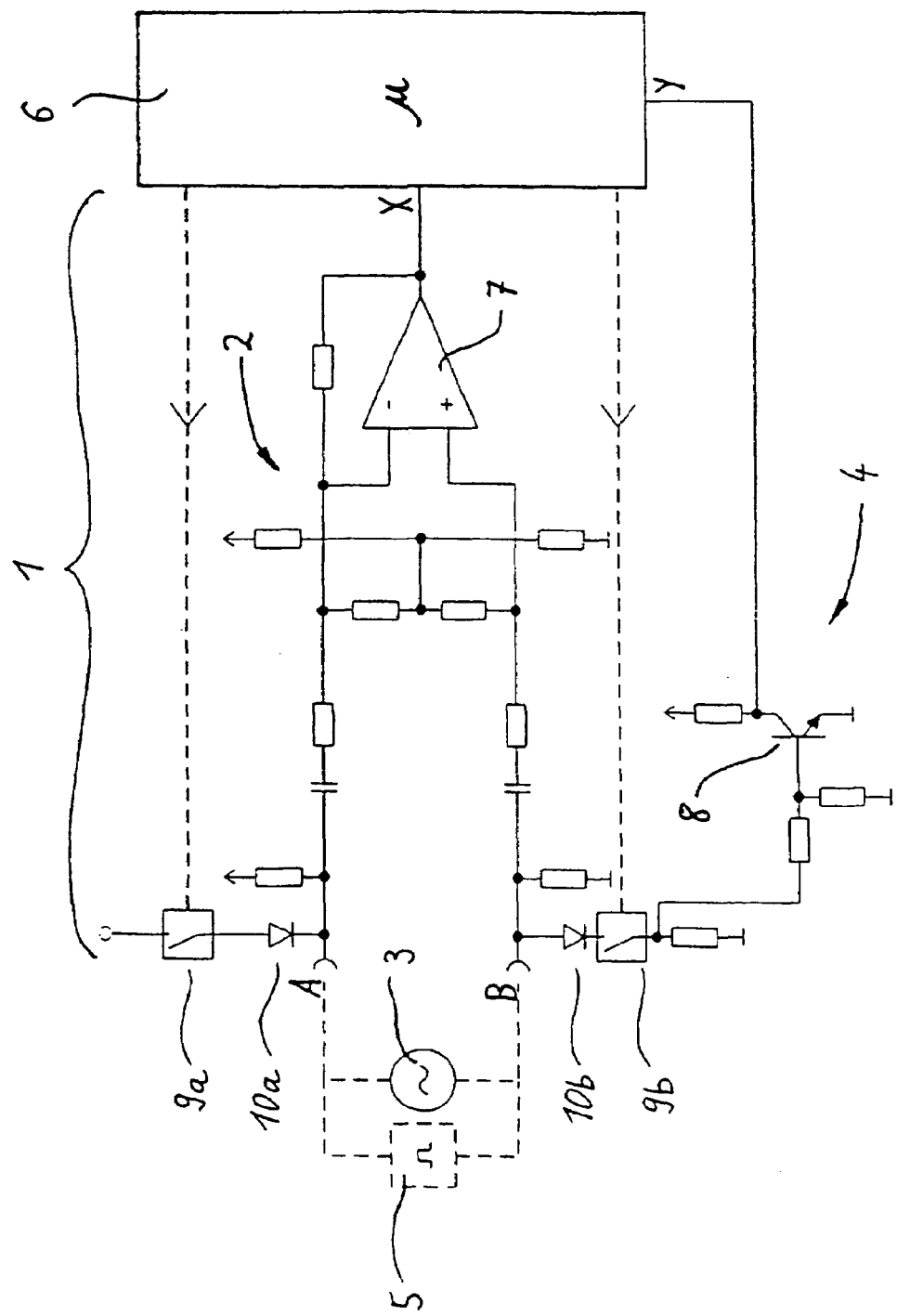

A signal conditioning circuit 1 is made up of a signal conditioning subcircuit 2 for a passive rotary speed sensor 3 and of an additional signal conditioning subcircuit 4 for an active rotary speed sensor 5. Both signal conditioning subcircuits 2 and 4 are used for the level adjustment of the rotary speed signals emitted by rotary speed sensors 3 and 5 for a postconnected electronic control unit 6, which is developed here as a microcontroller. Signal conditioning subcircuit 2 for passive rotary speed sensor 3, besides a fixed current limitation of the two sensor inputs A and B, includes a comparator 7, whose output signal goes to electronic control unit 6 via a first signal input X. By contrast, signal conditioning circuit 4 for active rotary speed sensor 5 is developed here as a fixed current limitation having a postconnected transistor driver 8, whose output signal reaches electronic control unit 6 via second signal input Y.

Signal conditioning circuit 1 also includes two switching elements 9a and 9b for activating one of the two signal conditioning subcircuits 2 or 4, depending on the sensor type. Switching elements 9a and 9b are developed as bipolar transistors that are controlled by electronic control unit 6 (dashed lines). Electronic control unit 6 detects the currently connected sensor type, and operates both switching elements 9a and 9b for the selection of the appertaining signal conditioning subcircuit 2 or 4. Electronic control unit 6, that is equipped with the appropriate software, tests, upon initial operation, whether an active rotary speed sensor 5 is connected at sensor input A, B. If the connected rotary speed sensor supplies a signal during standstill of the vehicle, an active rotary speed sensor 5 is involved, which is connected to sensor input A, B. On the other hand, if, during standstill of the vehicle, no signal is present at sensor input A, B, then a passive rotary speed sensor 3 is involved. The fact that a rotary speed sensor is connected at all is monitored via a connection, not shown, of input A and a coupling element of electronic control unit 6.

In series between operating voltage potential/ground and the two sensor inputs A and B, two damping diodes 10a, 10b are preconnected respectively to signal conditioning subcircuit 4 for optional rotary speed sensor 5. The two damping diodes 10a and 10b are used here to prevent a damaging current from signal conditioning subcircuit 4 for active rotary speed sensor 5, in the case of a connection of a passive rotary speed sensor 3 to sensor inputs A and B. The same is true for parallel connections above the input voltage.

The present invention is not limited in its specific embodiment to the preferred exemplary embodiment stated above. Rather, modifications thereof are also conceivable. Consequently, the design approach according to the present invention is also suitable for those signal conditioning subcircuits in which the signal of the passive rotary speed sensor is referred to ground. In this case, the ground reference is to be interrupted by inserting an additional switch into the ground line—preferably a transistor. Thus, in this instance, altogether three switching elements are required, which are preferably able to be controlled automatically via the electronic control unit. Furthermore, it is also possible to design the signal conditioning subcircuit for the active rotary speed sensor in the manner of a comparator having hysteresis, in order to achieve a suitable level adjustment.

LIST OF REFERENCE NUMERALS 1 signal conditioning circuit
2 first signal conditioning subcircuit
3 passive rotary speed sensor
4 second signal conditioning subcircuit
5 active rotary speed sensor
6 electronic control unit
7 comparator
8 transistor driver
9 switching element
10 damping diode
A first sensor input
B second sensor input
x first signal input
Y second signal input

What is claimed is:

1. An electronic circuit configuration, comprising:
an assigned signal conditioning circuit via which at least one rotary speed sensor of a vehicle is connected to an electronic control unit for further signal processing of a rotary speed signal, wherein the signal conditioning circuit includes a switching arrangement for optionally connecting one of an active rotary speed sensor and a passive rotary speed sensor,
wherein the switching arrangement includes a signal conditioning subcircuit for the active rotary speed sensor and a signal conditioning subcircuit for the passive rotary speed sensor, which are able to be activated using at least one switching element, depending on the sensor type that is connected.

2. The electronic circuit configuration as recited in claim 1, wherein the switching element includes a bipolar transistor.

3. The electronic circuit configuration as recited in claim 1, wherein the signal conditioning circuit includes at least one comparator.

4. The electronic circuit configuration as recited in claim 1, wherein the electronic control unit includes a microcontroller for the input-side supply of the rotary speed signal.

5. The electronic circuit configuration as recited in claim 1, wherein the electronic circuit configuration is included in a commercial vehicle.

6. The electronic circuit configuration as recited in claim 5, wherein the signal conditioning circuit includes at least one comparator, and wherein the electronic control unit includes a microcontroller for the input-side supply of the rotary speed signal.

7. The electronic circuit configuration as recited in claim 1, wherein the signal conditioning circuit includes at least one comparator, and wherein the electronic control unit includes a microcontroller for the input-side supply of the rotary speed signal.

8. An electronic circuit configuration, comprising:
an assigned signal conditioning circuit via which at least one rotary speed sensor of a vehicle is connected to an electronic control unit for further signal processing of a rotary speed signal, wherein:
the signal conditioning circuit includes a switching arrangement for optionally connecting one of an active rotary speed sensor and a passive rotary speed sensor,
the switching arrangement includes a signal conditioning subcircuit for the active rotary speed sensor and a signal conditioning subcircuit for the passive rotary speed sensor, which are able to be activated using at least one switching element, depending on the sensor type that is connected, and the electronic control unit detects the currently connected sensor type and operates the at least one switching element for the selection of the suitable signal conditioning subcircuit.

9. An electronic circuit configuration, comprising:
an assigned signal conditioning circuit via which at least one rotary speed sensor of a vehicle is connected to an electronic control unit for further signal processing of a rotary speed signal, wherein:
the signal conditioning circuit includes a switching arrangement for optionally connecting one of an active rotary speed sensor and a passive rotary speed sensor,
the switching arrangement includes a signal conditioning subcircuit for the active rotary speed sensor and a signal conditioning subcircuit for the passive rotary speed sensor, which are able to be activated using at least one switching element, depending on the sensor type that is connected,
the electronic control unit detects the currently connected sensor type and operates the at least one switching element for the selection of the suitable signal conditioning subcircuit, and respectively one switching element is connected in series between operating voltage potential/ground and two sensor inputs A and B of the signal conditioning subcircuit for the passive rotary speed sensor, respectively preconnected damping diodes being provided for preventing a current from the signal conditioning subcircuit for the active rotary speed sensor in the case of the connection of a passive rotary speed sensor.

10. The electronic circuit configuration as recited in claim 9, wherein the signal conditioning circuit includes at least one comparator.

11. The electronic circuit configuration as recited in claim 9, wherein the electronic control unit includes a microcontroller for the input-side supply of the rotary speed signal.

12. The electronic circuit configuration as recited in claim 9, wherein the electronic circuit configuration is included in a commercial vehicle.

13. The electronic circuit configuration as recited in claim 12, wherein the signal conditioning circuit includes at least one comparator, and wherein the electronic control unit includes a microcontroller for the input-side supply of the rotary speed signal.

14. The electronic circuit configuration as recited in claim 9, wherein the signal conditioning circuit includes at least one comparator, and wherein the electronic control unit includes a microcontroller for the input-side supply of the rotary speed signal.

* * * * *